March 2, 1937.　　　J. R. JOHNSON　　　2,072,339
FEED MECHANISM FOR MACHINE TOOLS
Filed Dec. 3, 1934　　　2 Sheets-Sheet 1
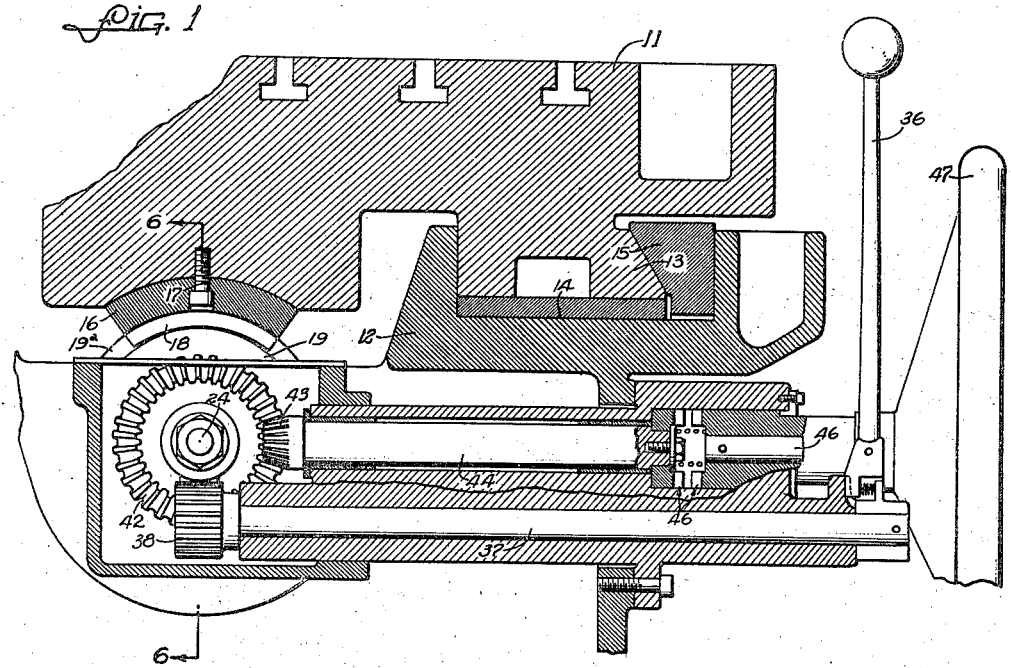
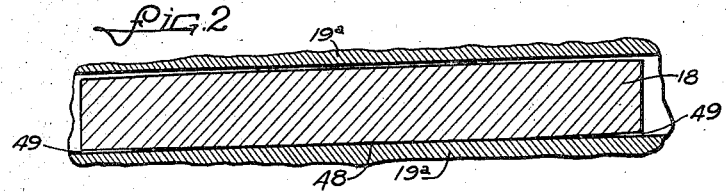
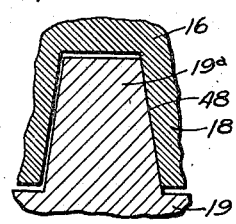
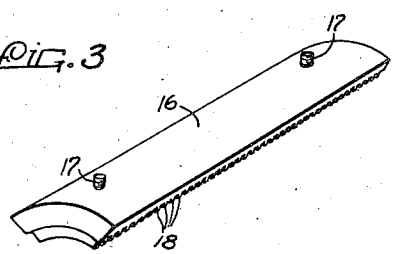
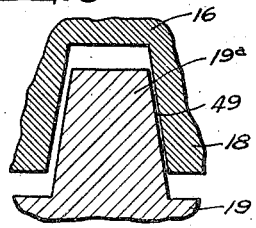
INVENTOR
John R. Johnson
By Lindahl, Parker, Carlson
ATTORNEYS March 2, 1937. J. R. JOHNSON 2,072,339
FEED MECHANISM FOR MACHINE TOOLS
Filed Dec. 3, 1934 2 Sheets-Sheet 2
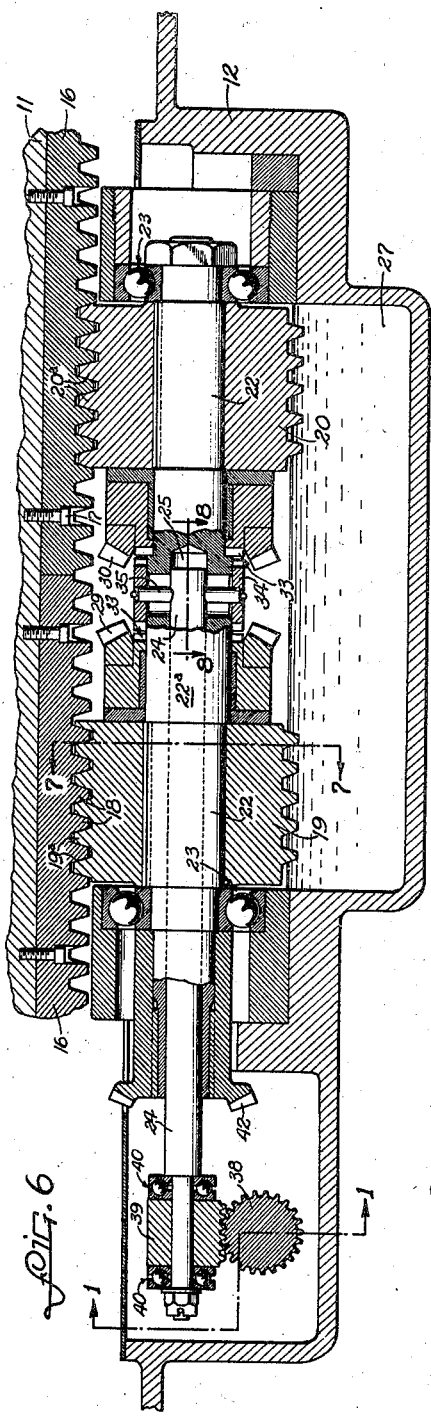
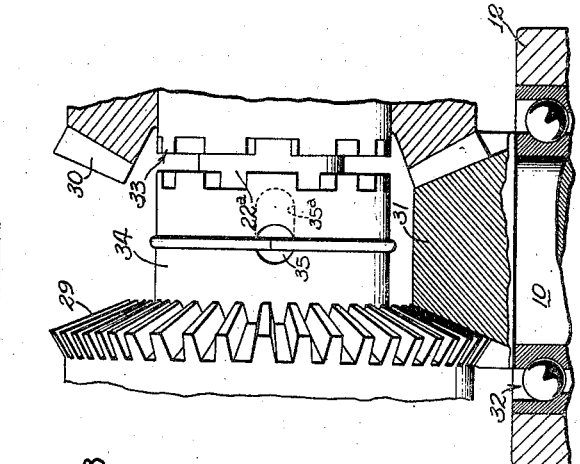
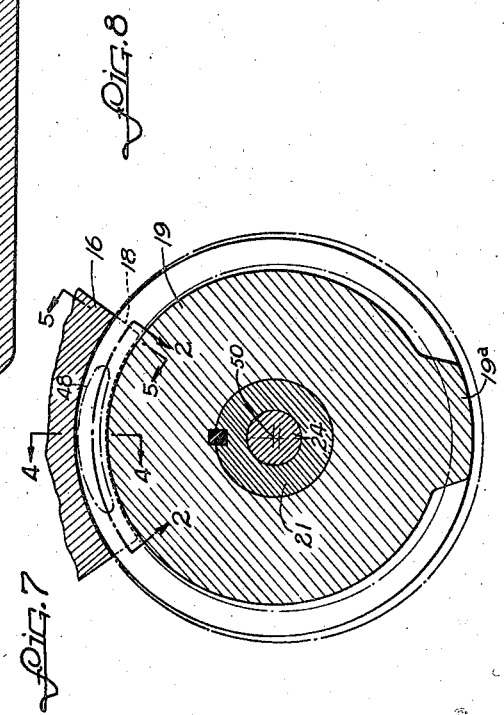
INVENTOR
John R. Johnson
By Chindahl, Parker, Carlson
ATTORNEYS Patented Mar. 2, 1937

2,072,339

UNITED STATES PATENT OFFICE 2,072,339

FEED MECHANISM FOR MACHINE TOOLS

John R. Johnson, Rockford, Ill., assignor to The Ingersoll Milling Machine Company, Rockford, Ill., a corporation of Illinois Application December 3, 1934, Serial No. 755,702

7 Claims. (Cl. 74—422)

This invention relates to power driven mechanism for imparting reciprocatory movements to heavy machine tool elements such as the work tables of milling machines.

The primary object of the invention is to provide a feed mechanism for the above purpose in which the driving forces are distributed over a substantially greater bearing area than in mechanisms heretofore used and which lends itself readily to effective and automatic lubrication of the bearing surfaces whereby to reduce wear and prolong the service life of the mechanism.

The invention also resides in the novel character of the mechanism by which the foregoing object is attained.

Other objects and advantages of the invention will become apparent from the following detailed description taken in connection with the accompanying drawings, in which Figure 1 is a fragmentary cross sectional view of the work table of a milling machine arranged to be actuated by a drive mechanism embodying the features of the present invention, the section being taken substantially along the line 1—1 of Fig. 6.

Fig. 2 is a fragmentary sectional view taken along the line 2—2 of Fig. 7.

Fig. 3 is a fragmentary perspective view of one of the feed elements.

Figs. 4 and 5 are fragmentary sectional views taken respectively along the lines 4—4 and 5—5 of Fig. 7.

Fig. 6 is a fragmentary sectional view taken along the line 6—6 of Fig. 1.

Figs. 7 and 8 are sectional views taken along the lines 7—7 and 8—8 of Fig. 6.

In the exemplary form shown, the invention is illustrated as a mechanism for converting rotary motion derived from a power driven shaft 10 (Fig. 8) into reciprocatory motion of a work table 11. As is common practice in horizontal milling machines, the table is supported from a bed structure 12 through the medium of flanges or ways 13 extending along opposite sides of the table on the underside thereof and slidable in guideways 14 on the bed in which the ways are held by clamps 15.

One of the cooperating feed elements of the present drive mechanism comprises an elongated rack 16 rigidly secured as by screws 17 to the underside of the table 11 along the center thereof. In cross section, the rack is curved and constitutes the segment of an internally screw threaded nut so as to define teeth 18 which are curved transversely of the rack and constitute elements of a screw thread. If desired, the rack may be formed in several sections (see Fig. 3) secured to the table in end to end relation as shown in Fig. 6.

The rotary feed element of the drive mechanism comprises two similar screws 19 and 20 of relatively short axial length having threads 19$^a$ and 20$^a$ mating with the grooves between the rack teeth 18. These screws are keyed respectively to a shaft 22 which is journaled at opposite ends in bearings 23. The bearings are supported by the bed 12 which also defines a reservoir 21, containing lubricating fluid in which the threads of the screws 19 and 20 dip.

The screws are arranged to be driven first in one direction and then in the opposite direction to effect reciprocation of the table 11. For this purpose, bevel gears 29 and 30 are rotatably mounted on the shaft 22 between the screws and each meshes with a pinion 31 on the drive shaft 10 which is journaled in a bearing 32. Projecting axially from the hubs of the gears 29 and 30 are clutch jaws 33 which are adapted for interengagement with mating jaws on a collar 34 which is shiftable in opposite directions along the shaft 22 to engage one or the other of the gears 29 and 30 and thereby determine the direction of rotation of the screws. The collar is connected to a cross pin 35 disposed in a transverse slot 35$^a$ in the shaft 22 and rigid with a shaft 24 slidable endwise in a bore extending through one end portion of the shaft 22. Shifting of the shaft 24 may be effected by a hand lever 36 fast on a rock shaft 37 and carrying a gear 38 meshing with rack teeth on a member 39 loose on the shaft 24 but connected for axial movement therewith through the medium of thrust bearings 40.

To enable the table to be moved manually, one end of the shaft 22 is keyed to a beveled gear 42 meshing with a pinion 43 on a shaft 44 journaled in the machine bed and adapted to be coupled by a suitable jaw clutch 45 to the shaft 46 of a hand wheel 47. By pressing the hand wheel inwardly, the clutch 45 is engaged after which the screw 19 will be turned and the table moved in a direction determined by the rotation of the hand wheel 47.

By forming the rack 16 with teeth which constitute elements of a screw thread, each tooth of the rack engages a side surface of substantial area on the threads 19$^a$ and 20$^a$ resulting in a multiple surface area of bearing contact between the rack and drive screws instead of the multiple line contact obtained in the drive mechanisms generally used. Such multiple surface contact is made possible through the use of a rack of segmental cross section which enables the bearings 23 to be located in positions to provide the necessary support for the screws 19 and 20 in spite of the length of the rack. For a similar reason, the rack teeth are exposed at opposite ends so that the contacting surfaces of the rack teeth and the screw threads may be lubricated automatically by fluid carried upwardly from the reservoir 27 by the threads of the screws 19 and 20.

To effect such lubrication, the teeth of the rack and the threads of the screw are specially formed so that the effective contact area between them will be disposed intermediate the ends of the rack teeth as indicated generally at 48 (Fig. 7) leaving clearance spaces 49 (Fig. 2) at opposite ends of the rack teeth into which spaces lubricating fluid will be carried by the screw thread and forced into the contacting areas. Such a construction may be obtained, for example, by tapering the opposite side surfaces of the screw threads 19ª and 20ª and the rack teeth and by cutting the rack teeth on a larger pitch diameter than the screws. When the rack and screws are thus constructed and mounted with the center 50 of the screw offset slightly toward the rack as shown in Fig. 7, the opposed surfaces of the teeth and threads will engage each other through the contact area 48 as shown in Fig. 4 but will not engage (see Fig. 5) at opposite sides of the rack. By virtue of the tapering shape of the clearance spaces 49 thus formed, oil on the surfaces of the screw threads 19ª and 20ª is carried effectually into the contact areas 48, and this regardless of the direction of rotation of the screw. This construction and mounting is also advantageous in that it avoids the necessity of mounting the screw and the rack with their centers in accurate alinement.

The drive mechanism above described is of simple and inexpensive construction, provides for distribution of the pressures over relatively large contact areas and insures effective lubrication of these areas. These features combine to reduce to a minimum the wear which will occur at the engaging surfaces of the two feed elements in normal service operation.

I claim as my invention:

1. The combination with a slidable machine element of a rotary drive shaft, a screw adapted to be driven thereby and having a thread the opposite side surfaces of which converge outwardly, a rack secured to said element and having teeth of a shape complemental to said screw thread and constituting segments of a screw thread, and means providing a body of lubricating fluid in which the thread of said screw dips, said rack teeth mating with the thread of said screw and being cut on a larger pitch diameter so as to form clearance spaces at one end of the rack teeth tapering toward the areas of contact between the teeth and the screw thread whereby to permit the lubricating fluid to be carried into said contact area.

2. The combination with a slidable machine element of a rotary drive shaft, a screw driven thereby and having a thread the opposite side surfaces of which converge outwardly, a rack secured to said element and having outwardly converging teeth constituting the segments of a screw thread and mating with the thread of said screw, said rack teeth being cut on a larger pitch diameter than the thread of said screw, and means rotatably supporting said screw with its thread meshing with the teeth of said rack and its center offset in a direction toward the rack.

3. The combination with a slidable machine element of an elongated rack secured to said element and constituting the segment of an internally screw threaded nut, the opposite surfaces of the rack teeth tapering outwardly, a screw of relatively shorter length rotatable about an axis extending longitudinally of said rack and mounted with its threads mating with the rack teeth, driving means by which said screw may be rotated, and means adapted to contain a body of lubricating fluid in which the periphery of said screw dips, the teeth of said rack and the threads of said screw being so formed as to confine the contact between the teeth and said threads to an area disposed intermediate the ends of the teeth whereby to leave a clearance space at one end of the teeth into which space lubricating fluid may be carried on the surface of the screw threads.

4. The combination with a slidable machine element of an elongated rack secured to said element and having curved teeth constituting elements of a screw thread, a screw of relatively shorter length, spaced bearings supporting said screw for rotation about an axis extending longitudinally of said rack with the screw thread mating with the rack teeth, driving means by which said screw may be rotated, and means adapted to contain a body of lubricating fluid in which the periphery of said screw dips, the teeth of said rack and the threads of said screw being so formed and positioned as to space the area of contact between the teeth and said threads from one end of the teeth whereby to leave a clearance space into which lubricating fluid may be carried on the surface of the screw thread.

5. The combination with a slidable machine element of an elongated rack of curved cross section secured to the underside of said element and having transversely extending depending teeth constituting elements of a screw thread, two spaced screws mounted to turn on an axis extending longitudinally of said rack and having threads mating with said teeth, a drive shaft, and clutches located between said screws and engageable selectively to cause movement of said element by said screws in one direction or the other.

6. The combination with a slidable machine element of an elongated rack secured to said element, a rotatable shaft extending along said rack, two separate screws fast on and spaced along said shaft, opposed bevel gears loose on said shaft and rotated in opposite directions, and clutch means disposed between said gears and operable selectively to connect said shaft with one or another of said gears.

7. The combination with relatively slidable machine elements of an elongated rack secured to one of said elements and constituting the segment of an internally screw threaded nut, a screw of relatively shorter length than said rack rotatable about an axis extending longitudinally of the rack and mounted on said other element with its thread mating with the rack teeth, power driven means for rotating said screw, and means for supplying lubricating fluid to the periphery of said screw, the teeth of said rack and the thread of said screw being formed to provide clearance spaces disposed between the opposite surfaces of the screw thread and rack teeth and said clearance spaces leading to the areas of contact between said surfaces and being located to receive lubricating fluid carried thereto on the surface of said screw thread and to induce the movement of said lubricant into said contact areas.

JOHN R. JOHNSON.